US006935748B2

(12) United States Patent
Kaufman et al.

(10) Patent No.: US 6,935,748 B2
(45) Date of Patent: Aug. 30, 2005

(54) 3D PROJECTION WITH IMAGE RECORDING

(75) Inventors: Steven P. Kaufman, Hooksett, NH (US); Arkady Savikovsky, Burlington, MA (US)

(73) Assignee: Laser Projection Technologies, Inc., Londonderry, NH (US)

( * ) Notice: Subject to any disclaimer, the term of this patent is extended or adjusted under 35 U.S.C. 154(b) by 0 days.

(21) Appl. No.: 10/936,833

(22) Filed: Sep. 8, 2004

(65) Prior Publication Data

US 2005/0058332 A1 Mar. 17, 2005

Related U.S. Application Data

(60) Provisional application No. 60/501,536, filed on Sep. 8, 2003.

(51) Int. Cl.[7] .................................................. G03B 21/14
(52) U.S. Cl. .......................................................... 353/28
(58) Field of Search .................... 353/28, 122; 356/620

(56) References Cited

U.S. PATENT DOCUMENTS 3,742,581 A 7/1973 Roodvoeis
4,847,181 A 7/1989 Shimokawa
4,861,620 A 8/1989 Azuma et al.
5,341,183 A * 8/1994 Dorsey-Palmateer ........ 353/122
5,381,258 A * 1/1995 Bordignon et al. ......... 359/202
5,395,718 A 3/1995 Jensen et al.
5,397,686 A 3/1995 Dominick et al.
5,430,662 A * 7/1995 Ahonen ......................... 703/1
5,436,027 A 7/1995 Offer
5,450,147 A * 9/1995 Dorsey-Palmateer ......... 353/28
5,506,641 A * 4/1996 Dorsey-Palmateer ......... 353/28
5,633,123 A 5/1997 Hill et al.
5,792,520 A 8/1998 Yamashita et al.
5,818,507 A 10/1998 Genovese
5,853,955 A 12/1998 Towfiq
5,855,802 A 1/1999 Acciai et al.
5,855,969 A 1/1999 Robertson
6,000,801 A * 12/1999 Dillon et al. ................. 353/28
6,007,929 A 12/1999 Robertson et al.
6,169,266 B1 1/2001 Hughes
6,317,616 B1 11/2001 Glossop
6,503,310 B1 1/2003 Sullivan
6,503,316 B1 1/2003 Sakoske et al.
6,547,397 B1 * 4/2003 Kaufman et al. ............. 353/28
6,680,121 B2 1/2004 Sakoske et al.
6,828,525 B1 12/2004 Hayes et al.
2003/0012902 A1 1/2003 Kim et al.
2003/0194507 A1 10/2003 Secord et al.
2003/0203122 A1 10/2003 Larson, Jr. et al.
2004/0013969 A1 1/2004 Delp et al.

FOREIGN PATENT DOCUMENTS

JP 403258600 A 11/1991

OTHER PUBLICATIONS

Donald C. O'Shea, Elements of Modern Optical Design (John Wiley & Sons, Inc. 1985) pp. 230–232.

* cited by examiner

*Primary Examiner*—William C. Dowling
(74) *Attorney, Agent, or Firm*—Peter J. Manus; Edwards & Angell LLP

(57) ABSTRACT

An apparatus and method for recording an image on the surface of a 3D object uses a laser projector that scans a light beam over the surface in an image pattern. The projector operates in a template imaging mode and an image recording mode where the beam scans at a speed that in a single pass/scan mode is typically four to five orders of magnitude slower than in the template imaging mode. A layer of a photosensitive material is applied to the surface of the object either partially or fully. Projection in the template imaging mode can guide the applying. The layer is substantially insensitive to ambient light for at least a period of time necessary to perform a desired processing step on the object. The layer has a maximum spectral sensitivity in the vicinity of the wavelength of the laser light beam. In one or multiple passes of the beam over the image pattern operating in the image record mode, the accumulated light energy dose density is sufficient to react the material and record the image.

27 Claims, 11 Drawing Sheets

3D PROJECTION WITH IMAGE RECORDING

CROSS REFERENCE TO RELATED APPLICATION

This application claims priority under 35 USC 119(e) of U.S. Provisional Application Ser. No. 60/501,536 filed Sep. 8, 2003, the disclosure of which is incorporated herein by reference.

BACKGROUND OF THE INVENTION

This invention relates in general to imaging systems. More specifically, it relates to a laser projection system that records a visible image on a three-dimensional object.

It is known to use lasers to project and record images onto objects in applications such as semiconductor manufacture, photocopying, medical imaging, and printers. In these applications, the geometry is typically well controlled and fixed. The projected light beam does not guide the placement of a three-dimensional ("3D") object, and the system typically has optical components that compensate for the well-defined curvature(s) of the object, e.g. a cylindrical drum. Nor is there optical feedback from the object back to the projecting laser. In most cases the laser light used for image recording is not eye safe, and the system is usually contained in an enclosure.

3D laser projection is also a known technology used in manufacturing processes as a soft tooling technique. A laser projector utilizes computer aided design ("CAD") data for a given 3D object to produce rapidly moving, vector-scan, laser beam. Typical linear velocities of the beam spot on an object can be near 45,000 inches per second. The beam strikes a given surface of the object precisely following a predetermined, computer-controlled trajectory in a repetitive manner. There is typically optical feedback from a target object to the projector in these manufacturing applications. With sufficiently high beam speed and refresh rate, the trajectory of the projected beam on the object appears to human eye as a continuous glowing line. A set of projected lines or contours will appear as a solid glowing image on the surface of an object. The projected image is perceptible by a viewer as a glowing template that can be used to assist in the precise positioning of parts, components, work pieces, and the like on any flat or curvilinear surface in 3D space. In addition, laser projection can be used to produce a glowing image of a text, e.g. to convey part numbers, work instructions, and other alphanumeric information.

Presently 3D vector-scan laser projection technology is widely used in manufacturing of composite parts, in the aircraft and marine industries, or other large machinery assembly processes, truss building, and other applications. It gives the user ability to eliminate expensive hard tools, jigs, templates, and fixtures. It also brings flexibility and full CAD compatibility into the assembly process.

It is desirable to use templating by 3D laser projection not only for positioning in assembly and part placement, but also for alignment assistance in drilling holes, cutting edges, painting, and other material processing operations. However, in such material processing applications the laser beam would be blocked by the material processing tools, fixtures, and workers, thus preventing proper alignment of the tool with the point aimed by the laser. It would also be necessary in many cases to separate the laser projection operation from the material processing operation in space and in time.

It is therefore a principal object of this invention to provide a 3D projection system and method that can both project a light image on a surface of a 3D object and record that image so that it persists on the object in the absence of the projection.

Another object of the invention is to provide a 3D laser projection system and method that allows selective application of the image on portions of the object.

Still another object of this invention is to provide an apparatus and method to guide the placement of a layer or layers of a material on the surfaces of the 3D object, and further subsequent processing of a laser-recorded image.

A further object of this invention is to provide an apparatus and method with the foregoing advantages that is also substantially insensitive to ambient light or to a conventional glowing template for a period of time sufficient to accomplish the desired processing.

Still another object is to provide a laser projection system with the foregoing advantages capable of operating at such laser beam power levels that it does not need to be enclosed and does not require operator to use protective eyewear.

Yet another object of the invention is to provide a recorded image on a 3D object produced by laser projection that can be readily removed from the object even after exposure and fixing.

A further object of the invention is to reduce the cost and enhance flexibility of large scale, high-precision manufacturing processes.

SUMMARY OF THE INVENTION

A light projector directs a beam of light onto a three-dimensional object located at a distance from the projector and steers the beam in a vector scan manner to trace out an image or pattern on the object. The light projector is preferably a 3D laser projector that has a laser, laser beam expanding and focusing optical system, a beam steering device for directing the laser beam onto the object surface, optical feedback device, and a control system.

In the present invention, the laser projector is capable of operating in two distinctive modes:

1) Template imaging mode: rapid beam movement to generate a glowing template with high refresh rate on the surface of the object. Beam speed is adequate for producing an image perceptible by a viewer as a solid pattern but it is too high for proper exposing the photosensitive material on the surface of the object.
2) Image recording mode: slower beam movement with appropriate velocity control to selectively expose the photosensitive material. The light energy dose delivered to the photosensitive material by the laser beam is adequate to create persisted image with sufficient contrast on the surface of the object.

As a preferred embodiment, the laser projector for the 3D projection and image recording system uses one laser that provides both abovementioned modes of operation. As an alternative embodiment, the laser projector comprises two (or more) aligned lasers, for example, a green laser for template imaging and a blue laser for image recording.

The laser projector uses optical feedback from the object to provide range and location information in 3D space to the projector's control system.

The object has a layer of a photosensitive material applied on at least a portion of its outer surface. The laser projector is positioned so that its output beam can 1) guide the placement of this layer on the object and/or 2) provide a sufficient dose density of light energy to the layer to record the projected image in the layer.

The photosensitive material is a substance that has the following properties:

1) The photosensitive material can be "positive" in that it records image as dark lines on a light background, or "negative" in that it records image as light lines on a dark background.
2) The photo-reactive recording process, whether "positive" or "negative" takes place and provides sufficient contrast when the light energy density is above the material's exposure dose density threshold. Typical exposure dose densities according to the present invention are in the range of 10 $mJ/cm^2$ to 200 $mJ/cm^2$. The material is substantially insensitive to ambient light when exposed to ambient light at least for a period of time necessary to perform a desired processing step or steps on the object.
3) The photosensitive material is sensitive, in terms of this photo-reactive process, only to a limited part of spectrum—in the vicinity of the projector's beam wavelength for a given laser projector.
4) An image with an adequate contrast recorded in the photosensitive material may be obtained in a single pass trajectory with sufficient energy dose delivered in one scan or in a multi pass scanning exposure when the photosensitive material accumulates smaller doses received in each scan to reach appropriate level of photo reaction.
5) The photosensitive material can be applied to the surface of the object as a liquid (including a spray) covering the surface with a thin photosensitive layer or as a photosensitive layer carried on a sticking tape. Other options may include adding a photosensitive component to the surface paint.

In this invention, the laser projector operates in the template imaging mode to guide the selective placement of the photosensitive material on the object and/or to guide other processing steps. In the image recording mode, a relatively slow beam motion with specifically controlled scan velocity, e.g. a linear velocity on the object's surface of several inches per second that depends upon the distance between the projector and the object, and upon other factors, delivers a sufficient exposure dose of light energy to the photosensitive material. That dose triggers a photo-chemical reaction in the material that records the light image. The light dose may be delivered as a single pass in one scan over the complete image, or, typically at a faster linear scan velocity, it may be delivered cumulatively through multiple repeated scans of the complete image. The exposed image can be itself visible and persist after the projection terminates, or it can require further fixing, through the application of 1) additional light energy, 2) heat, or 3) chemical treatment.

A presently preferred photosensitive material for the layer is formulated to react to record an image when it is irradiated with an adequate dose of laser light energy. The reacted material records the projected image, but is substantially insensitive to ambient light. The recording can be an "exposing" with the cured material not exhibiting a visible contrast with respect to the unreacted background, or it can be immediately visible, whether with contrast, change in reflectance, or change in some other optical characteristic.

In one form of this invention, the laser projector operates in its template imaging mode to guide the selective application of the photosensitive material to the object, e.g. an application of a pre-coated sticking tape, spraying, or applying a liquid as by painting with a brush or roller. In another form, the photosensitive material is applied to the entire object, or over one or more selected portions of the surface of the object, and the projected laser light is used only to record the image. In another form of the invention, the laser projection in its template imaging mode also guides the fixing of the recorded image.

Because obtaining of consistent image recording performance from the photosensitive material requires stable light energy dose density across the entire image scan trajectory, 1) the linear light beam scan velocity, 2) light beam spot width on the object, and 3) light beam power of the beam spot as the beam strikes and travels over the photosensitive layer are coordinated to deliver uniformly the desired energy dose level to record the projected image. The intensity and focus of the light beam can be varied, as well as the angular velocity of steering mirrors of the laser projector, in order to compensate for variations in the light energy dose density delivered as the distance from the laser projector to the object, or the angle of incidence of the beam onto the object are changing. Preferably, the processor controlling galvanometers that drive the mirrors is programmed to make these adjustments in angular scan velocity in response to sensed distance, and beam-to-object angular orientation.

These and other features and objects of the invention will be more readily understood from the following detailed description of the invention which should be read in light of the accompanying drawings.

DETAILED DESCRIPTION OF THE EMBODIMENTS

Figure 1:
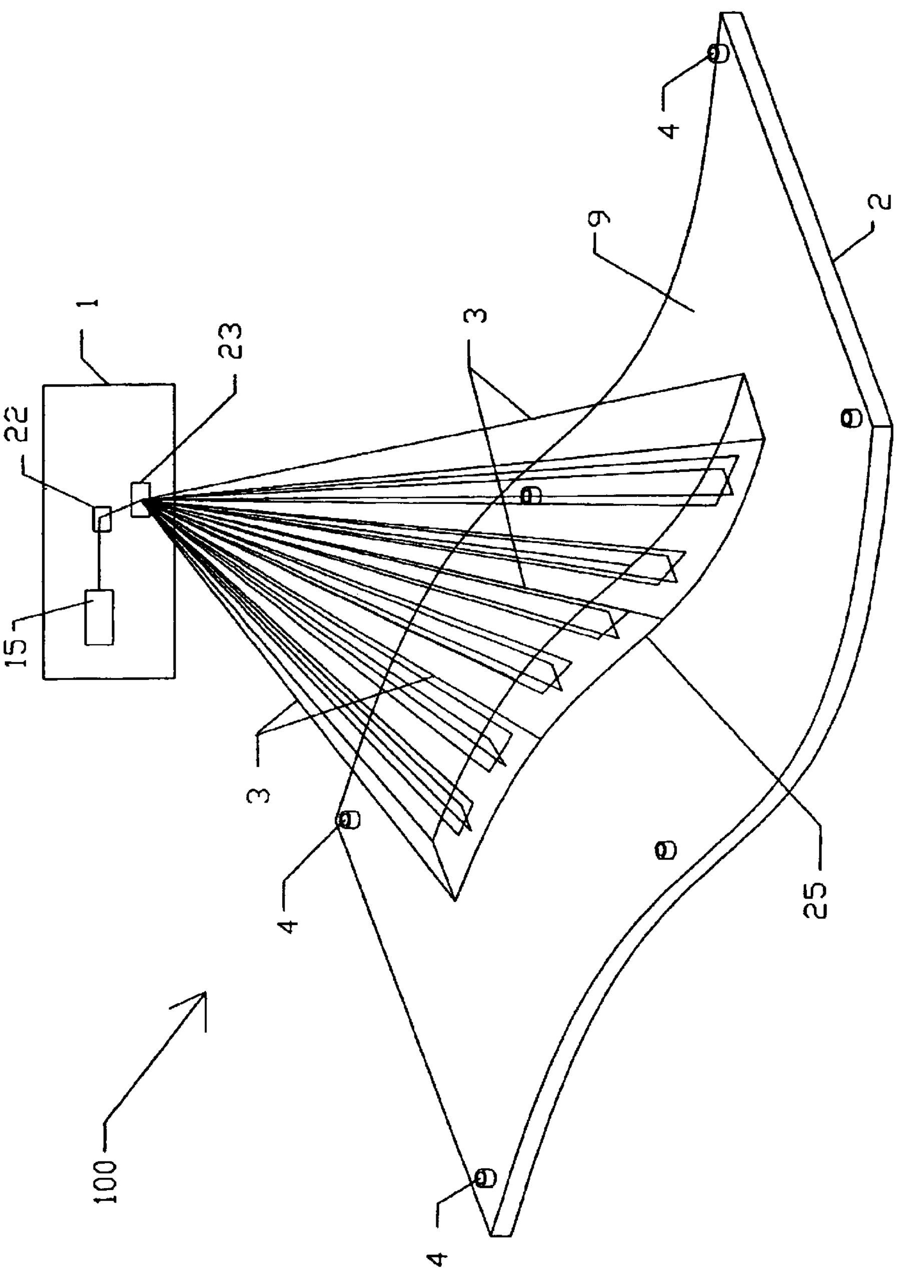
FIG. 1 is a partially schematic view in perspective of a 3D light projection image recording system according to the present invention.

FIG. 1 shows a 3D light projection system 100 according to the present invention that directs a light beam 3 at a given wavelength onto a facing outer surface 9 of a 3D object 2. A layer 25 of a photosensitive material is applied over a defined area of the surface 9. The light projector 1 is preferably a 3D laser projector shown in a more detailed schematic form in FIG. 2. The projector 1 has a laser 15, a laser beam expanding and focusing optical system 17 for shaping the laser beam 32, an optical feedback device 18, a two-axis beam steering device 19 for directing the output beam 3 onto the object surface 9, and a control system 21 for controlling the laser beam power level and controlling the beam steering device 19. The beam steering device 19 preferably includes X mirror 22 and Y mirror 23 mounted on shafts of galvanometer servo motors (not shown). Rotational movement of the X and Y mirrors rapidly directs the beam 3 over a defined surface area. The control system 21 actuates galvanometer servo motors to generate desired vector scan image trajectory by managing the laser beam angular position, velocity, and acceleration/deceleration in two angular dimensions.

Figure 2:
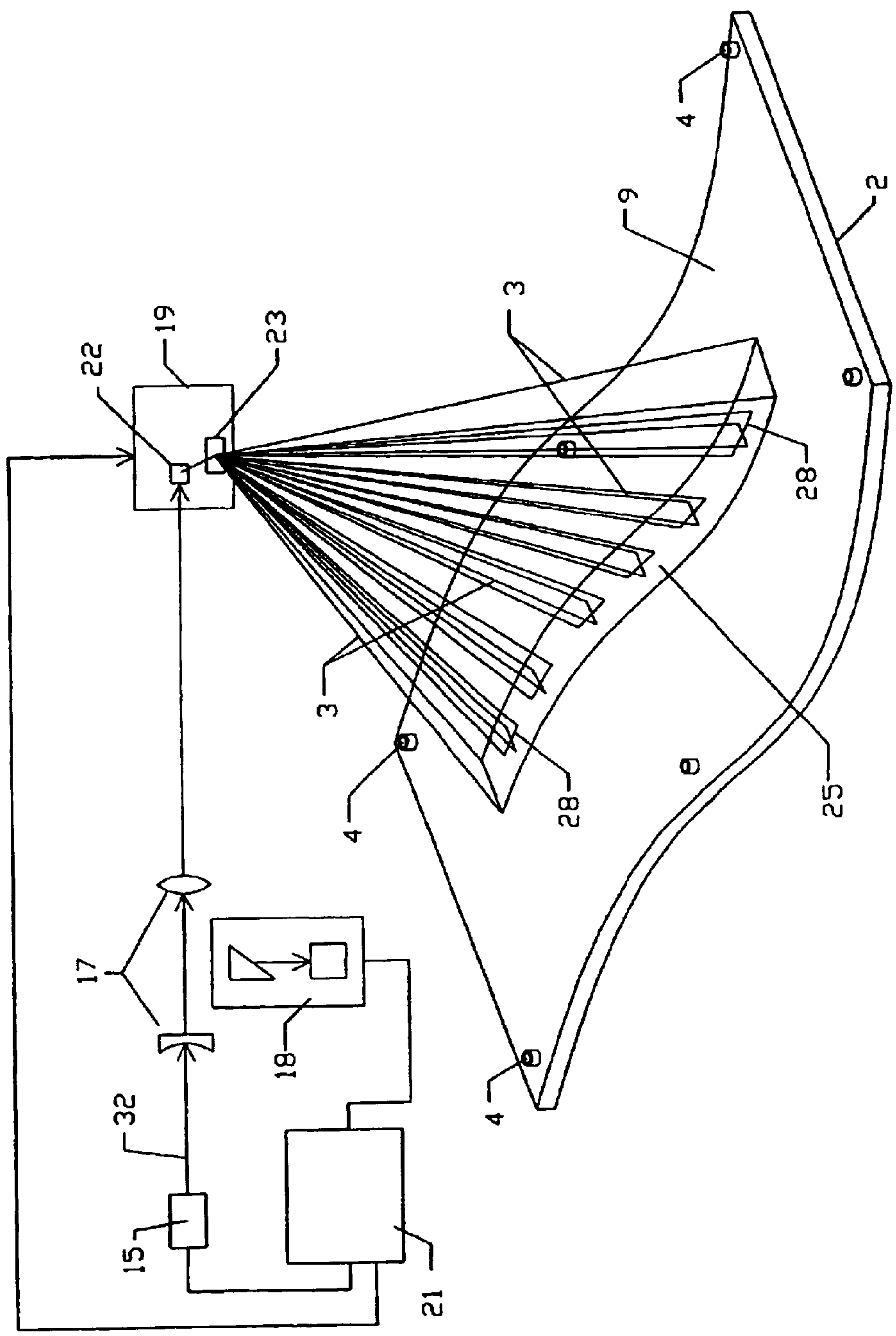
FIG. 2 is a view of the 3D laser projector shown in FIG. 1 with a more detailed schematic view of the laser projector.

The 3D laser projector includes an optical feedback capability 18, as it known in the art of industrial laser projection. Such projector is similar to the type described in applicants' U.S. Pat. No. 6,547,397, the disclosure of which is incorporated herein by reference. FIG. 1 shows the object surface 9 having a set of retro-reflective reference targets 4 mounted on it. When the light beam 3 strikes a target 4, a portion of the incident light is reflected directly back along the beam path to the projector where it is detected by the optical feedback device 18. As illustrated in FIG. 2, the output of the optical feedback device 18 is connected to the control system 21 which drives the beam steering device 19 to scan a target and to obtain the optical feedback.

The control system 21, e.g. a convention microprocessor controller, is the brain of the laser projector. It has access to CAD data for targets locations and for the image trajectory points with respect to coordinate system of the design model of the object 2. As explained in greater detail in U.S. Pat. No. 6,547,397, the 3D laser projector scans reference targets and uses optical feedback information to accurately determine its location and orientation in 3D space with respect to the object's coordinate system prior to performing actual projection. Herein this process is referred to by the phrase "buck into the object's coordinate system". Therefore, the laser projector determines distances between itself and the reference targets, and the given points of projection trajectory. This allows a steering of the laser beam during projection in a precisely arranged way and to direct it at each given moment of time exactly toward the given trajectory point (x, y, z) on the surface 9 of the 3D object. Because of this capability, the present invention can be used flexibly in a manufacturing application for material processing. For example, the projector can be mobile, and brought to a work site, e.g. a fuselage of an airplane on a door of a truck. The projector and the object do not have to be fixed in a well-defined physical relationship.

In the present invention, the laser projector 1 under control of system 21 is capable of operating in two distinctive modes:

1) Template imaging mode: rapid beam movement along vector scan trajectory to generate a glowing template with high refresh rate on the surface 9 of the object 2. Beam speed is adequate for producing an image perceptible by a viewer as a solid pattern, but it is too high for proper exposing the photosensitive material 25 on the surface 9 of the object 2. This mode is preferably used to guide placement or selective application of the photosensitive material 25 and further subsequent processing of a laser-recorded image.

2) Image recording mode: slower scanning movement with specific variable velocity control to selectively expose the photosensitive material 25. The light energy dose delivered to the photosensitive material by the laser beam is adequate to create ("cure") a persistent image 28 with a sufficient contrast when cured or later "fixed" with respect to the adjacent surface area of the object 2.

The projector 1 operates in both template imaging mode and image recording mode at beam power levels that meet applicable regulatory safety standards. Output laser beam power is preferably less than 5 milliwatts, so that usage of protective eyewear or operation in an enclosure is not required in accordance with laser safety regulatory requirements. A laser with output beam power less than 5 milliwatts is classified as class IIIa or lower by the US Code of Federal Regulations Title 21 Part 1040 or as class 3R or lower by the International Electrotechnical Commission Standard IEC 60825-1.

The wavelength of the output beam 3 is significant. As a preferred embodiment, the laser projector 1 uses one laser 15 that provides both above-mentioned modes of operation. The presently preferred light is green, typically with a wavelength of about 532 nm. This wavelength works well for glowing template imaging because the human eye sensitivity is at a maximum for green light. Therefore, the photosensitive material 25 used for image recording preferably has its maximum sensitivity at a green part of spectrum.

Figure 3:
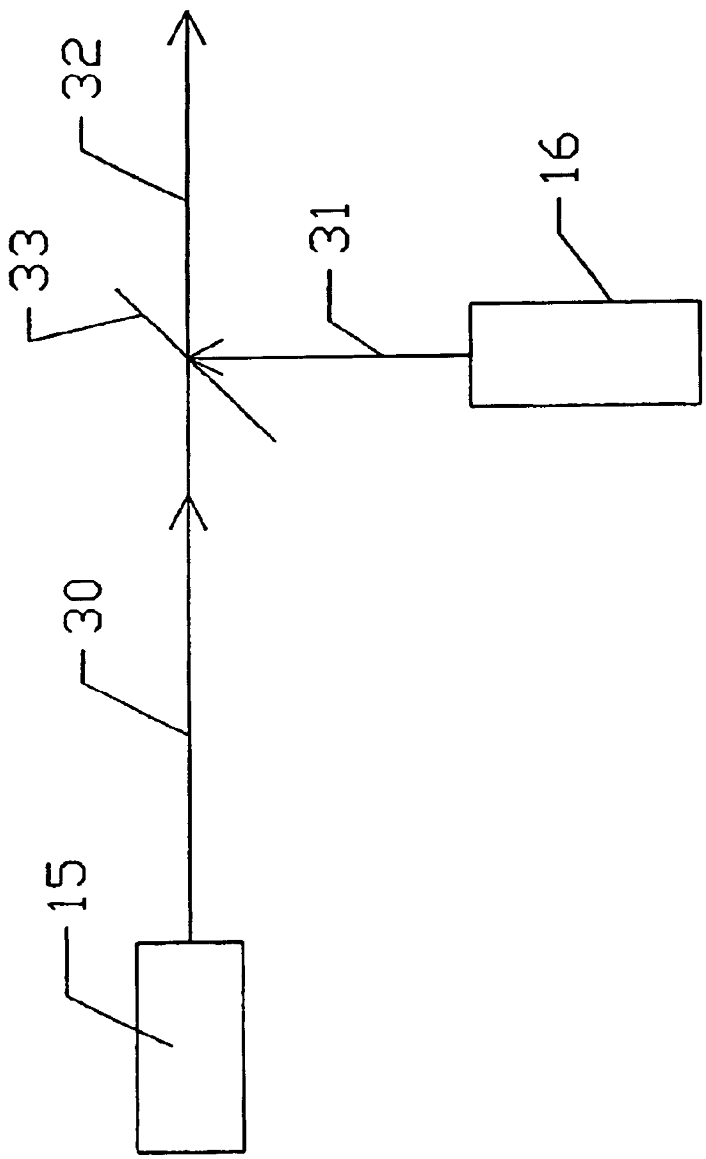
FIG. 3 is a detailed schematic view of an alternative embodiment of the projector shown in FIGS. 1 and 2 that uses two lasers.

As an alternative embodiment, the laser projector 1 comprises two (or more) aligned lasers. Such an alternative embodiment is illustrated in FIG. 3. Laser 15, preferably emitting green light, is used in the template imaging mode, and a second laser 16, for example, a blue laser is used for image recording to expose a photosensitive material having its maximum sensitivity at a blue part of spectrum. The output beam 30 from the laser 15, and the output beam 31 from the laser 16, are aligned and combined by the beam combining plate 33 into the beam 32 that is directed into the expanding and focusing optical system 17 shown in FIG. 1. The beam combining plate 33 is well known in the art as having high transmission for the wavelength of the beam 30 and high reflection for the wavelength of the beam 31.

Figure 4:
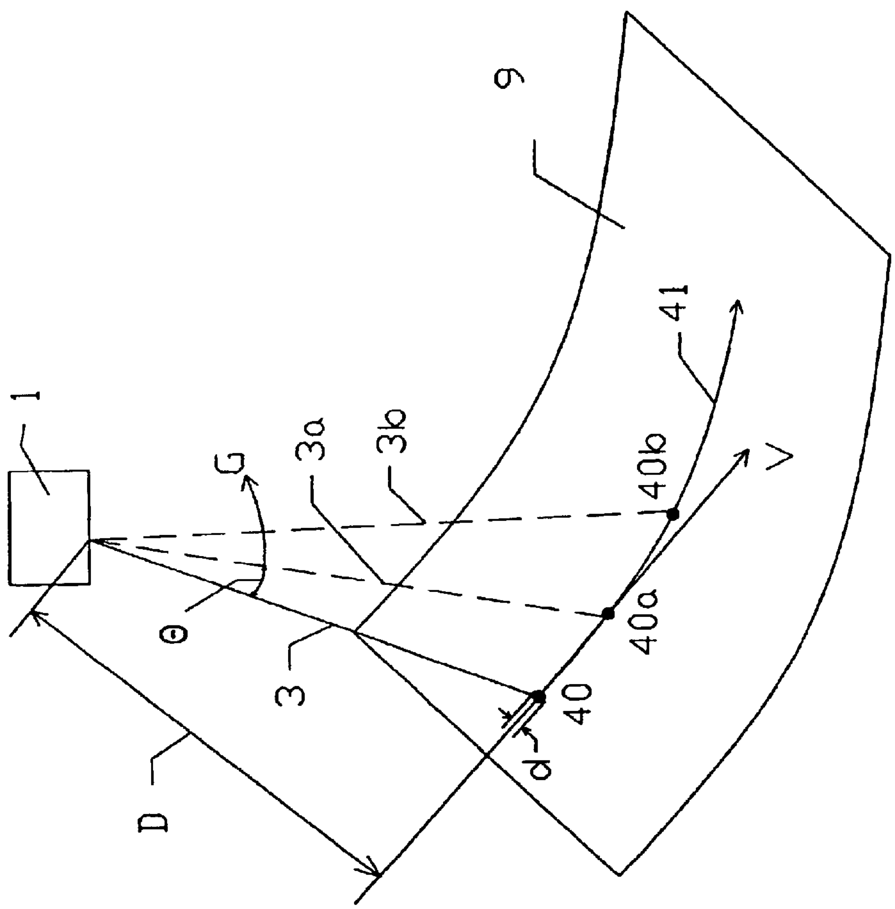
FIG. 4 is a partially schematic view in perspective generally corresponding to FIGS. 1 and 2 showing a laser beam according to the present invention tracing out an image pattern trajectory on a surface of a 3D object.

FIG. 4 illustrates how the output laser beam 3 traces out an image pattern. The beam 3 forms focused light spot 40 on the surface 9 of the object 2. As it well known in the art of optics (see, for example, Donald C. O'Shea "Elements of Modern Optical Design" published in 1985 by John Wiley & Sons), a focused laser beam spot has Gaussian profile intensity distribution and an effective diameter d defined at the intensity level of $1/e^2$ which is equal approximately 0.135. The value of d depends on the distance D from the projector 1 to the object 2 and from the output aperture A of the focusing optical system 17:

$$d=K_\lambda \cdot D/A \tag{1}$$

where $K_\lambda$ is the constant proportional to the wavelength of laser light.

Figure 5:
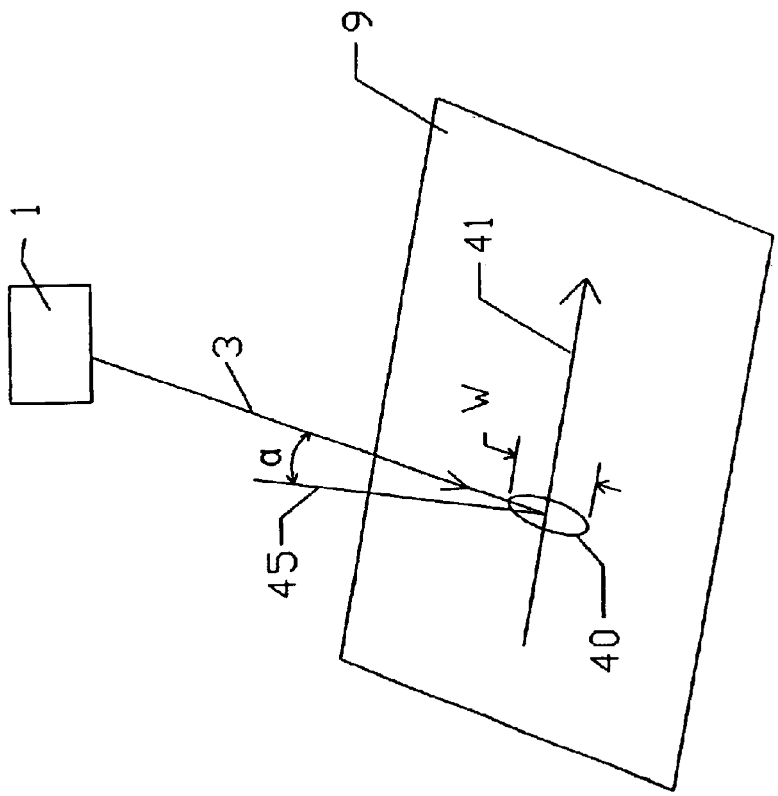
FIG. 5 is a partially schematic view in perspective illustrating non-orthogonal incidence of the laser beam on the object.

In general, the shape of the light spot 40 on the surface 9 depends on the angle of incidence of the beam 3 toward the surface 9. A beam spot is circular when the beam 3 is orthogonal to the surface 9. The case with the non-orthogonal beam incidence is illustrated in FIG. 5. As the angle of incidence between the normal 45 to the surface 9 and the beam 3 increases, the spot 40 elongates into a more elliptical shape. FIG. 5. shows the width W of the elongated spot 40 measured in a direction transverse to the direction of the image trajectory 41. The width is W determined in accordance with the following expression:

$$W=d/\cos(\alpha) \tag{2}$$

where $\alpha$ is the projection of the angle of incidence onto a plane orthogonal to the trajectory 41.

As the mirrors 22 and 23 steer the output beam 3, the spot 40 travels along the image pattern trajectory 41 on the surface 9. FIG. 4 shows instant beam locations 3, 3*a*, and 3*b* and corresponding spot locations 40, 40*a*, and 40*b*. The distance between the projector 1 and spot 40 is shown as D. The beam angular travel in space between locations 3 and 3*a* is shown as angle θ. The beam angular velocity G is defined in units of radians per second. The relationship between the beam angular velocity and the spot linear velocity is as following:

$$V=G\cdot D \tag{3}$$

When the laser projector 1 operates in the template imaging mode it provides very high speed angular beam motion with a high repetition rate so that a human eye cannot distinguish the moving spot—the trajectory is perceptible by a viewer as a solid glowing line. A typical angular beam velocity can be about 250 radians/second. The corresponding spot linear velocity will be higher at a longer distance in accordance with (3). At a typical distance D of 15 feet the typical spot linear velocity is about 45,000 inches/sec.

In the template imaging mode the projector works in the manner of conventional 3D laser projection and it always runs at a maximum possible angular beam velocity to reduce image flicker. The technique of achieving maximum angular beam velocity utilizing trapezoidal velocity control to preserve dynamic precision of laser projection is described in detail in U.S. Pat. No. 6,547,397.

Because the angular beam velocity control in the template imaging mode is optimized to achieve maximum possible image refresh rate regardless of the distance from the projector to the object it is not suitable for the image recording. As explained further below, the 3D image recording mode requires a special angular velocity control that is substantially different from the beam motion control technique used for template imaging in a conventional 3D laser projection.

A central aspect of the present invention is that a laser projector of the type described above, operating on a 3D object, can be used to record the "glowing template" image on the object so that it persists, and is visible, even after the laser project is stopped, or when a worker or a tool blocks the light beam path from the laser to the object. The system and method of the present invention uses the layer 25 of a photosensitive material applied to the surface 9 of the object 2 in combination with the laser projector 1.

Figure 6:
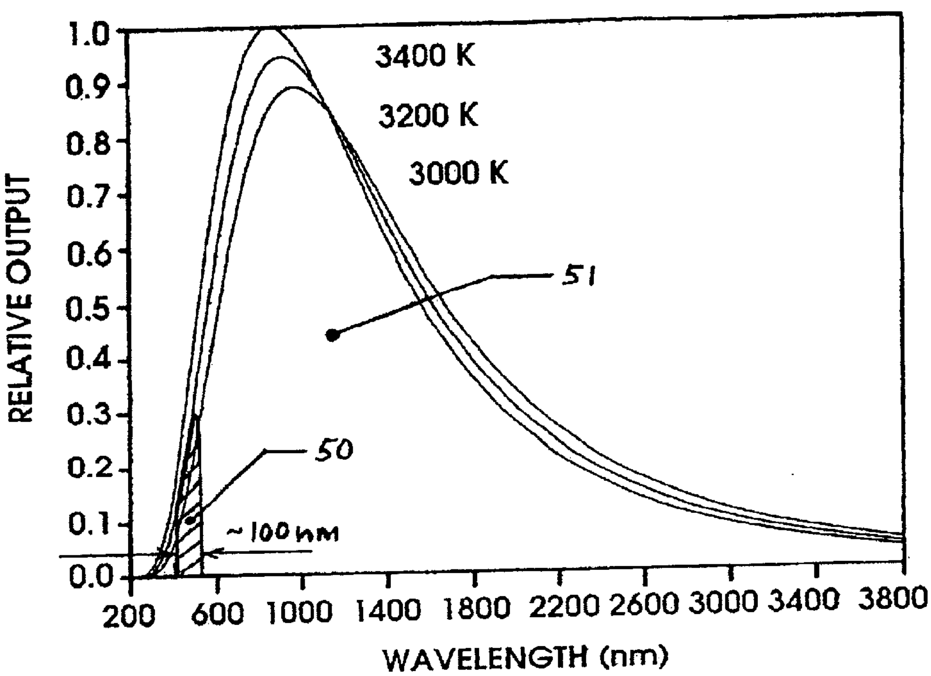
FIG. 6 is a graph comparing the spectral sensitivity bandwidth of the photosensitive material in accordance with the present invention with the spectrum of incandescent bulb irradiation representing ambient light.

The photosensitive material is substantially insensitive to ambient light, at least for a period of time sufficient to complete the processing. This characteristic of the photosensitive material derives from its selective spectral sensitivity—it is maximally responsive to the wavelength of the laser projector light used in the image recording mode. The width of spectral response of the photosensitive material is preferably not more than 100 nm. FIG. 6 shows relative amount of energy, represented by the area 50, that is received by the photosensitive material 25 of the present invention in comparison with the full spectrum energy, represented by the area 51, that is irradiated by a incandescent bulb having the filament temperature 3000–3400 degrees K. Such a bulb is as an example of ambient white light. As it can be seen from the FIG. 6, there is a small fraction of the white light irradiated by the bulb across the full spectrum that falls into the spectral bandwidth of the photosensitive material sensitivity. Typically, it is less than 1%. In sharp contrast, the comparative effectiveness of the laser light used by the photosensitive material is close to 100%.

Another factor that contributes to the photosensitive material 25 being much more sensitive to the laser beam than to ambient light is the difference between the average light power density in the laser beam focused spot and the light power density created by the ambient light incident onto a surface of an object. A typical effective diameter d of the spot 40 (see FIG. 4) is about 0.03 inches at the typical distance D of 15 feet. So, the typical average laser light power density of an image trajectory that is 50 inches long will be 3 milliwatts per inch$^2$ using a laser with 5 milliwatts of output beam power. To compare, the light power density created by a incandescent bulb that provides 500 lux white light illumination on a surface is about 18 milliwatts per inch$^2$ across the full spectrum. Taking in account the above explanation about spectral effectiveness of the photosensitive material that is less than 1% for the ambient white light one can estimate that, for the given example, the photosensitive material is at least fifteen times more sensitive to the laser light used for image recording than to the ambient white light. As a result, the photosensitive material is substantially insensitive to ambient white light even though the ambient light contains light of the same wavelength as the laser beam. This aspect has imperative practical significance because it allows sufficient period of time to accomplish all the desired processing including, for example, material placement, image recording, and further fixing or "developing" of the recorded image, without unwanted exposure of the photosensitive material by the ambient light.

A photo-reactive process occurs inside the layer 25 of the photosensitive material under the focused laser beam and it progresses with more laser light energy delivered to the layer. The photosensitive material responds to incident light energy in a threshold or cumulative manner to produce a detectable, visible image formed when a sufficient dose of light energy is received over a unit area of the layer 25.

The light energy dose delivered per unit area of the layer 25 is a function of various factors, including the power P of the incident light beam 3, the width W of the light beam spot 40 measured in a direction transverse to the direction of the image trajectory 41, and the linear velocity V of the beam spot 40 as it is travels over the surface 9. If the focused laser beam has Gaussian profile intensity distribution then the light energy dose density varies in a direction transverse to the direction of the image trajectory 41 as a Gaussian distribution as well.

The light energy dose density $S_R$ can be determined at a particular relative threshold level R in accordance with the following equation:

$$S_R=K_R\cdot P/(W\cdot V) \tag{4}$$

where a beam spot coefficient $K_R$ is a function of the shape of the beam spot on the surface 9, the distribution of the light intensity in the spot, and the relative level R between 0 and 1 at which the light energy density is specified.

The units for the light energy dose density are usually millijoules per centimeter squared (mJ/cm$^2$).

For example, for the Gaussian spot intensity distribution and when the beam is orthogonal to the surface of the object, the approximate expression for the light energy dose density at R=0.5 (50% level) is as follows:

$$S\approx 0.6\cdot P/(d\cdot v) \tag{5}$$

where d is the spot diameter at $1/e^2$.

By combining expressions (1)–(4) one can obtain the following expression for a light energy dose density delivered to the photosensitive material in a single pass exposure scan trajectory:

$$S=C\cdot P\cdot \cos(\alpha)/(G\cdot D^2) \quad (6)$$

where C is the constant for the given laser light wavelength, the optical system output aperture, spot profile intensity distribution, and the given relative threshold level.

A presently preferred material for the layer 25 is a polymer with selective spectral response as described above. A characteristic of the material is that it needs a sufficient amount of light energy received per the unit area to trigger the photo-reactive recording process—to "cure". Preferably, curing means producing visible image 28 with adequate contrast so that it persists in the material. The recorded image may be visible as dark lines on a light background (positive process) or as light lines on a dark background (negative process). Achieving visual contrast of at least 50% is preferred. A presently preferred green light (532 nm) photosensitive material is manufactured and sold by the Rhom & Haas Electrochemical Materials Division of the Rhom & Haas company under the trade designation "RegiStar".

Alternatively, the photo-reactive process may produce a hidden image that is not exhibiting a sufficient visible contrast with respect to the unreacted background and requires further fixing. In another alternative embodiment, the photo-reactive process induced by an adequate dose of light energy delivered by the laser beam can change other optical characteristics such as reflectance or a phase shift, or chemical or mechanical characteristics of the material along recorded image lines.

A given photosensitive material requires a particular exposure dose density to accomplish proper image recording. Typical exposure dose densities according to the present invention are in the range of 10 mJ/cm$^2$ to 200 mJ/cm$^2$.

Because the required dose density value is substantially fixed for a given photosensitive material and a given wavelength of the incident laser light, it is necessary to provide stable light energy dose density across the entire image scan trajectory to obtain consistent image recording performance. Therefore, as it can be seen from the equation (6) above, the laser projector has to operate in its image recording mode with varying angular beam velocity G and/or the output beam power P to accommodate for variations in the distance D and the angle $\alpha$ along the image trajectory 41 throughout the scan of a complete image pattern on the surface 9.

As a preferred embodiment, in the image recording mode, with reference to FIGS. 4 and 5, as the distance D or the angle $\alpha$ increases, the angular velocity G of the beam scan should decrease to hold the light energy dose density delivered by the beam 3 to the layer 25 on the surface 9 at the same value. As an alternative embodiment, the output beam power P can be increased instead or together with the angular beam velocity. The control system 22 performs required real time variable angular beam velocity control via the beam steering device 19 in accordance with equation (6) to keep stable the light energy dose density during the image recording mode. It utilizes trajectory CAD data including components of the surface normal vectors 45 along the trajectory 41 and information about distances between the laser projector 1 and the points of projection trajectory 41 obtained as a result of bucking into the object's coordinate system to activate galvanometer servo motors and properly rotate mirrors 22 and 23.

Another aspect of this invention is that the projector is constructed and operated to impart an adequate dosage of light energy per unit area of layer 25, either in a single trajectory pass, or cumulatively with multiple, repeated scans. In a presently preferred form of the invention, the laser projector 1 is operated in the image recording mode to record an image into the layer 25 in one pass scan cycle, or in multiple scan cycles at proportionally faster scan speeds than in a single pass scan mode. At a typical distance D of 15 feet the typical linear scan velocity V on the surface 9 in the single pass image recording mode is several (as an illustrative example only, ¼ inch/sec to 10 inches/sec) inches per second, or about four to five orders of magnitude slower than the typical template imaging scan velocity of 45000 inches/sec. In the multiple scan image recording mode, the linear velocity V and the angular beam velocity G are, in general, N times faster than in the single pass scan mode, where N is the number of scans needed for the layer 25 to accumulate the same exposure dose as in the single pass scan. In some applications, the multiple scan image recording mode is preferable because it allows user to monitor the process of image recording more easily. However, the number N is practically limited to about 5,000 because of limitation in the ability of the photosensitive material to linearly accumulate the absorbed energy dose. In other words, the linear dynamic range of the photosensitive material is limited to about 5,000. That is why the typical template imaging scan velocity that is maximized to achieve the high refresh rate in a glowing template image is too high for proper exposing the layer 25. The major reason for the limited dynamic range is believed to be the fact that, at a high scan speed, the time it takes for the spot 41 to completely cross over a given point on the surface 9 becomes shorter than the characteristic dwell time of the photosensitive material, e.g. the time needed to trigger the photo-reactive process.

The layer 25 can be applied in many ways. In one form, it is applied to the entire surface 9, e.g. by spray or painting the photosensitive material onto the object 2. It is also contemplated that the photosensitive material can be admixed to a primer or other paint layer to reduce the number of painting steps in the manufacturing process. To reduce the amount of the photosensitive material used, and thereby save money, or for other reasons, it is also within the scope of this invention to apply the layer 25 to selected portions of the surface 9, to located selected sites for material processing, including the application of information or decorative markings.

In addition to the direct application of the layer 25, whether alone or admixed with a paint or other carrier, it is also contemplated that the layer 25 can be applied to a flexible substrate that is then applied to the surface 9 of the object 2. In particular, for selective applications of the layer 25 to large objects, the layer 25 can be manufactured as a coating on a conventional roll of tape with an adhesive backing layer. The adhesive layer fixes the tape on the object in a region where further manufacturing processing on the object is desired, or visual information is to be applied. The tape approach has the advantage that the photosensitive layer can be applied more uniformly and subjected to better quality control than with an on-site spraying, resulting in a more uniform and reliable image recording. An adhered tape also aids certain processing operations, e.g. in stabilizing the location of a drill operating on the object. However, tape may not conform well to certain shapes such as objects that are highly curved, curved in complex forms, or in or around corners. It is also contemplated that where the coating may be exposed to ambient light before the processing of the object for a long period of time sufficient to cause an image recording reaction, a removable light-blocking layer or cover may be fixed over the layer 25 until the processing is to commence. Such opaque cover may also be beneficial to provide longer shelf life for the tape form of the photosensitive material.

Figure 7:
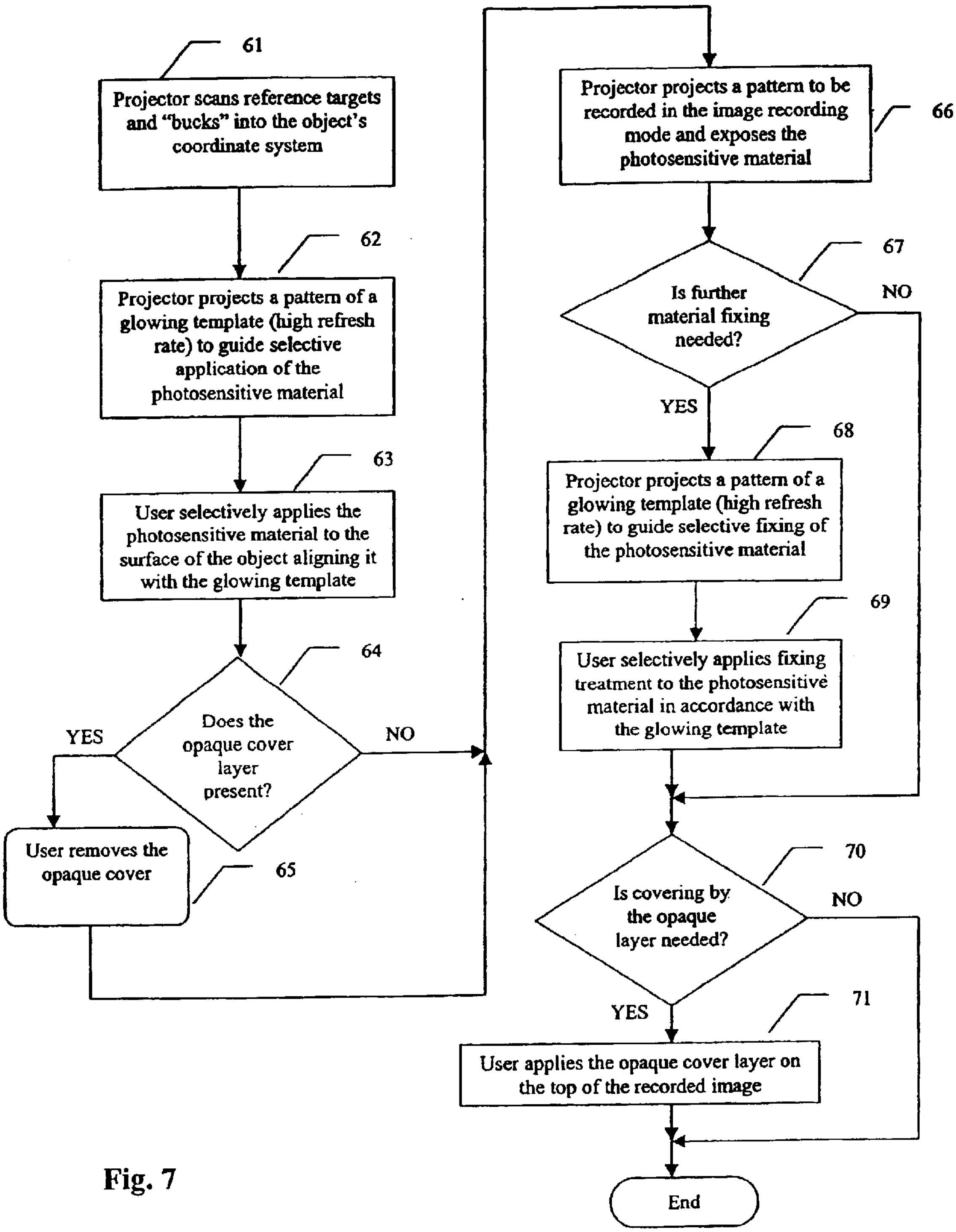
FIG. 7 is an exemplary flow chart of one form of an image recording process according to the present invention.
Figure 8:
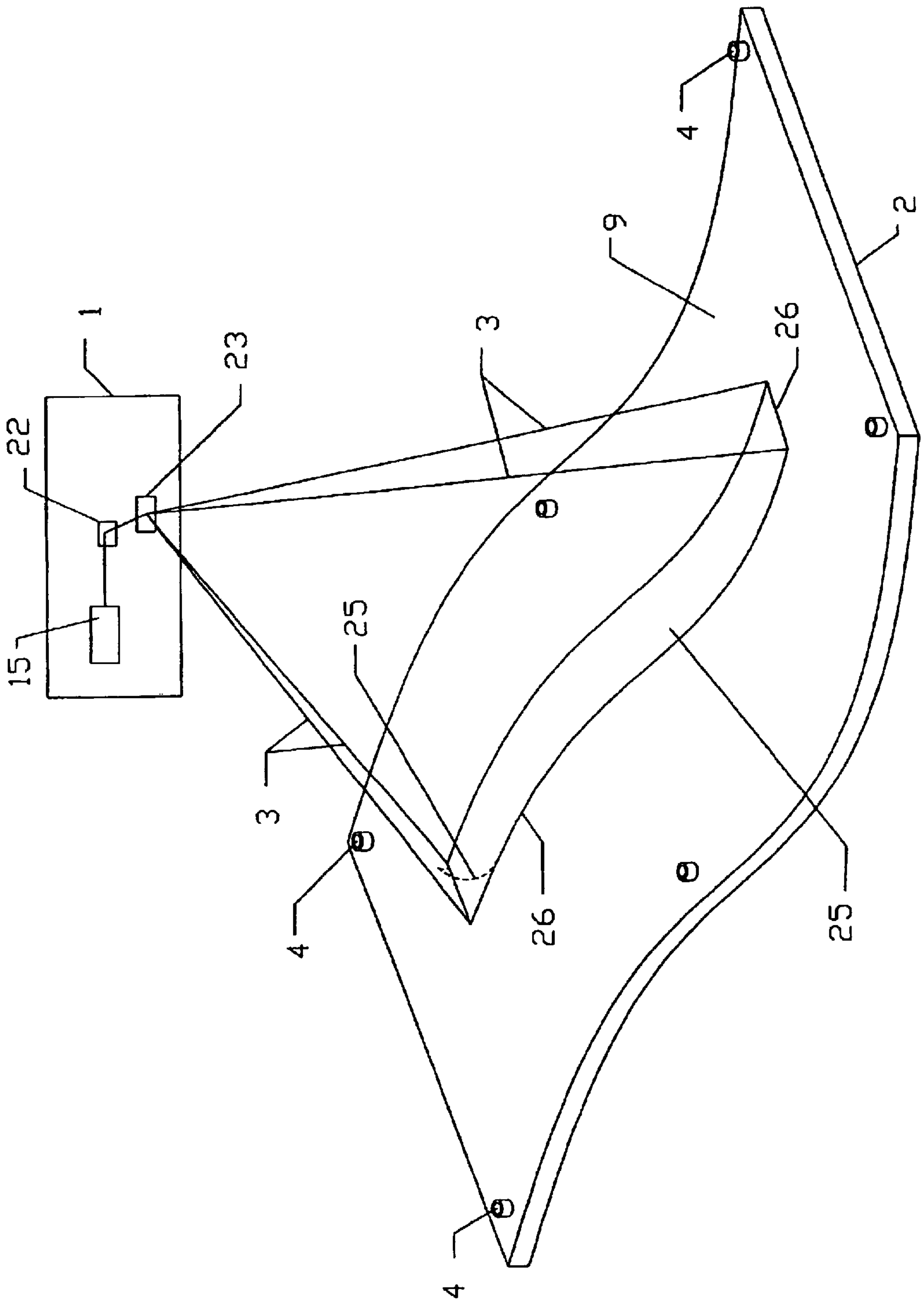
FIG. 8 is a partially schematic view in perspective corresponding to FIG. 1 showing an alternative embodiment of the invention that projects a glowing template to guide selective application of a photosensitive material.
Figure 9:
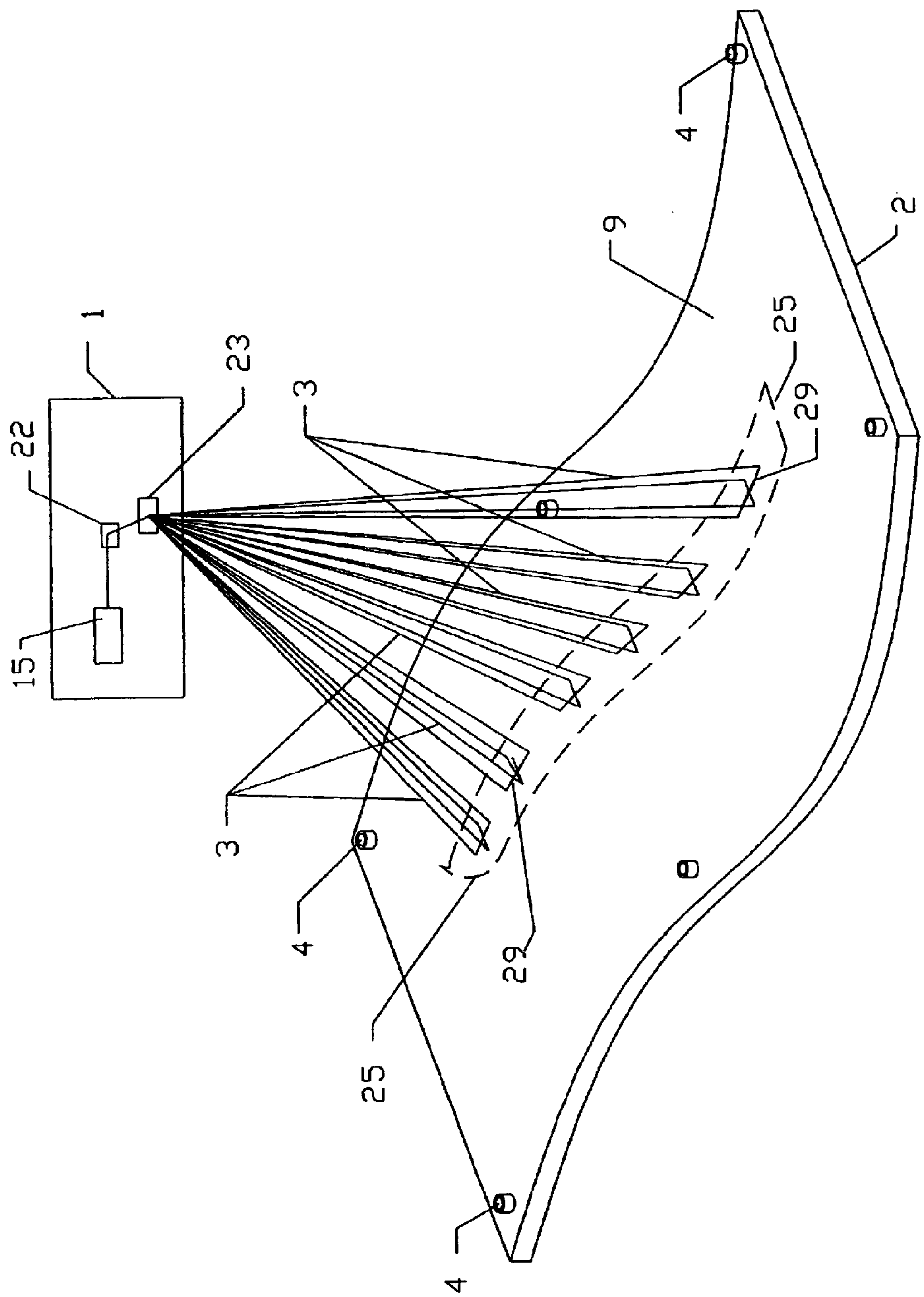
FIG. 9 is a partially schematic view in perspective corresponding to FIGS. 1 and 8 showing projection of an alternative glowing template.
Figure 10:
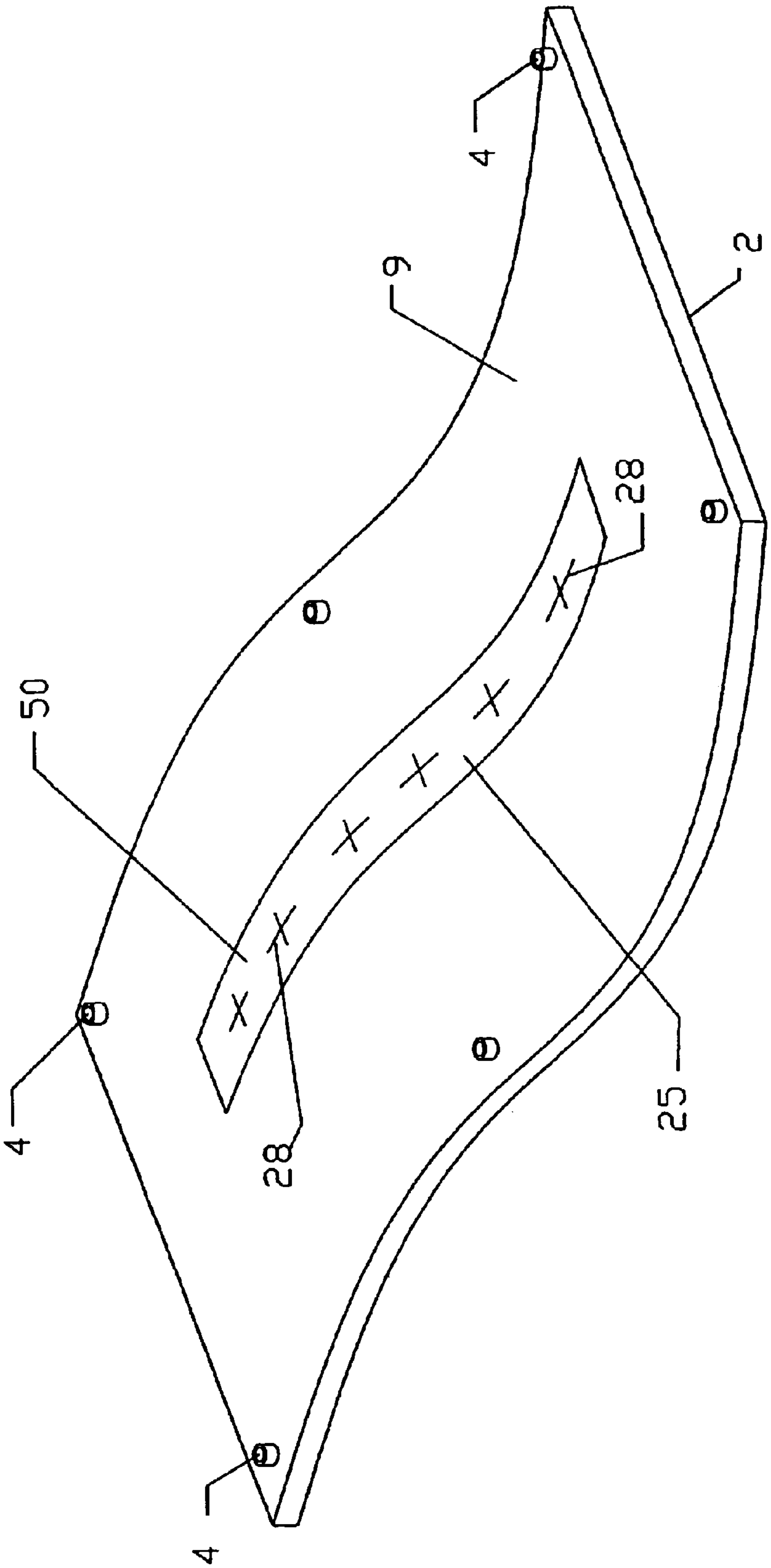
FIG. 10. is a view in perspective of the recorded image produced by the embodiment shown in FIG. 9.

Another embodiment of this invention is the use of the laser projection in its template imaging (high refresh rate) mode to guide the whole image recording process. An example of such process in the form of flow chart is shown in FIG. 7. FIG. 8 shows projecting of the glowing template to outline the contour 26 of the area where the layer 25 should be placed. Alternatively, FIG. 9 shows the glowing template pattern 29 which is essentially the same pattern as the pattern 28 intended for image recording. In the case shown in FIG. 9 a user places a layer of a photosensitive material on the surface 9, making sure the layer 25 encompasses the template 29. As explained above, the template imaging mode essentially does not expose the photosensitive material. In addition, an opaque cover layer on the top of the layer 25 in the flexible tape form described above may help in the case when longer time is needed to properly place the layer 25. In such case, the opaque cover layer can be removed directly before image recording step. The projected pattern of the glowing template 26 or 29 on the object 2 guides the selective application of the layer 25 on the surface 9, whether by spraying, other painting, application of the aforementioned tape, or otherwise. In other words, the laser projector 1, operating in the template imaging mode, directs the application of the layer 25 on the surface 9. Next, in the image recording mode, the laser projector 1 records the image pattern 28. FIG. 10 shows the finally recorded image 50 that persists in the absence of the projection. At this point an opaque cover layer may be applied on the top of layer 25 in order to protect it in the case when a long storage time under a bright ambient light is needed before further usage. The pattern 28 is shown in the form of group of crosses as an illustrative example only: it should be understood that any pattern or text can be recorded in the same way.

Figure 11:
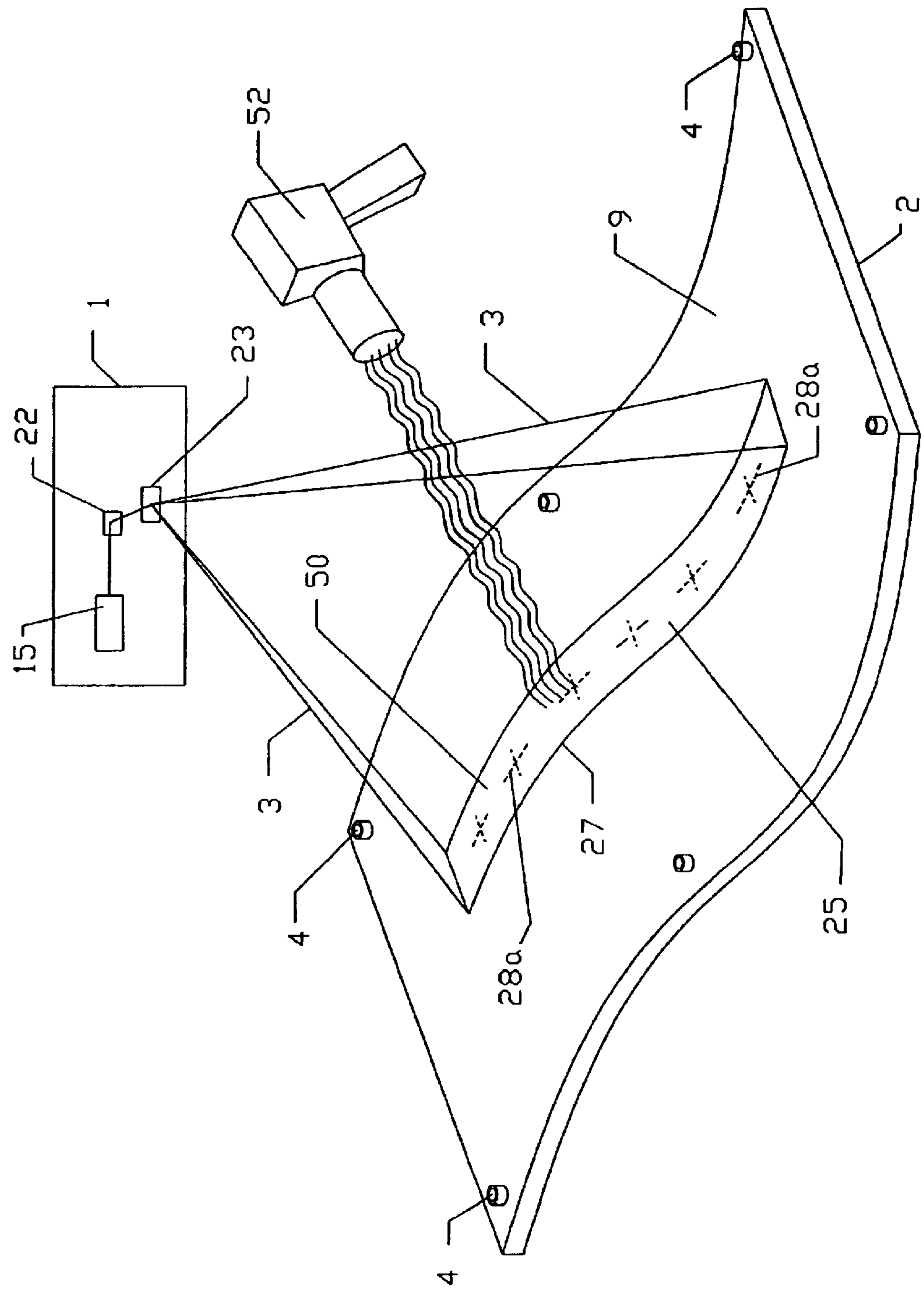
FIG. 11 is a view in perspective corresponding to FIGS. 1 and 8–9 of a glowing template guiding a fixing process according to the present invention.

An adequate dose of light energy records the image, but it is not necessarily immediately visible and/or usable once the image recording is completed. In one form of the invention, the laser projector cures or reacts the image, but then the recorded image is "fixed" or developed with a next step processing. This step can take the form of the application of heat, e.g. with a hot air blower, a chemical that reacts with the exposed material, or irradiation with additional light energy. The fixing can produce or enhance the visibility of the recorded image, or it can increase its durability, the length of time that it visibly persists after the laser recording, or it can change chemical or mechanical characteristics of the material along recorded image lines. Hence, in certain applications, the laser projector 1 is needed to guide a step of fixing the recorded image, e.g. by again operating in the high-speed, template imaging mode to show where to apply heat or a chemical treatment to fix the image. FIG. 11 shows an example of the laser guided heat application. While the pattern 28*a* of the recorded image 50 may not be visible yet, the projected glowing template 27 outlines the area where the heat flow should be directed from a heat gun 52 to fix or develop the recorded image 50, and make it visible.

More specifically, with reference to FIG. 7, the example of an image recording process guided by laser projection in its template imaging mode is as follows:

At step 61 the laser projector 1 scans the reference targets 4 and accurately determines its location and orientation in 3D space with respect to the object 2 coordinate system. At this point it is ready to use CAD data for given image trajectories for projection. At step 62 the laser projector 1 actually projects a pattern of a glowing template to guide selective application of the layer 25. Further, at step 63 the user selectively applies the photosensitive material, aligning it with the projected glowing template. At this point, if the opaque cover layer is present, it is removed by user at step 65. Then, at step 66 the actual image recording is performed. After that, if further material fixing is needed, the laser projector 1 projects a pattern of a glowing template at step 68 to guide selective fixing treatment in accordance with the glowing template image. The user selectively applies a fixing treatment, for example, heat at step 69 in accordance with the glowing template projected. Finally, if covering by an opaque layer is needed to protect the recorded image, the user applies the opaque cover layer on the top of the recorded image at step 71.

After the image has been recorded, it can be readily removed if necessary. For example, the layer 25 can be washed off the object along with the recorded image—whether or not it remains visible or otherwise detectable. If the layer 25 is applied as a component layer of a flexible tape or the like, after the desired manufacturing step is complete, the recorded image is removed by simply peeling the tape or like flexible composite material off the object.

While the invention has been described with respect to its preferred embodiments, it will be understood that various modifications and variations will occur to those skilled in the art from the foregoing detailed description and the accompanying drawings. For example, while one 3D laser projector has been described in detail, multiple such projectors can be used, e.g. with each projector scanning and recording images on a different portion of the object, or on different objects. Further, while the laser projector has been described principally as operating in the green portion of the visible spectrum, photosensitive materials may react more strongly to the other portions of the spectrum, and other wavelengths, e.g. those more toward, or even lying within, the ultraviolet may be used to promote a more rapidly formed or more durable image. Still further, as described above, it is within the scope of this invention to use a projector or projectors that scan the same object with light beams of more than one wavelength, with the wavelengths selected to optimize either the production of a visible glowing template or image recording.

These and other modifications and variations that will occur to those skilled in the art from the foregoing detailed description and drawings are intended to fall within the scope of the appended claims:

What is claimed is:

1. A process for recording an image on a 3D surface of an object in conjunction with a processing step performed on the object, comprising:

applying on the object a layer of a photosensitive material that is substantially insensitive to ambient light for a sufficient period of time to complete the processing; and projecting as a scanned beam of light a 3D laser light pattern of the image onto the layer at a image record scan speed and intensity that reacts the layer coincident with said scanned light pattern to record the image in the layer.

2. The process of claim 1 wherein said layer substantially covers the outer surface of the object.

3. The process of claim 1 wherein said layer covers at least one selected portion of the object.

4. The process of claim 1 wherein said applying is by coating said layer on a flexible substrate and securing said substrate on the object.

5. The process of claim 1 wherein said applying is by painting or spraying said photosensitive material on the object.

6. The process of claim 1 wherein said photosensitive material is a polymer.

7. The process of claim 1 wherein said image recording further comprises fixing said reacted image.

8. The process of claim 7 wherein said fixing comprises a step selected from the group consisting of heating the reacted image, chemically treating the reacted image and irradiating the reacted image with light energy.

9. The process of claim 1 or 7 wherein one of said reacting and said fixing comprises creating a change along recorded image lines in at least one of: the optical characteristics of the layer including visible contrast, reflectance and phase shift, chemical characteristics, and mechanical characteristics.

10. The process of claim 1 wherein said projecting can occur in two modes, said image recording projection and a projecting mode at a beam scan speed that displays said scanned light pattern as a glowing template, but does not react the layer to record the image.

11. The process of claim 10 wherein said glowing template guides said applying.

12. The process of claim 10 wherein said image recording further comprises a fixing of the reacted image, and said glowing template projecting guides said fixing.

13. The process of claim 10 wherein said beam scan speed on said object of said glowing template projecting in a single pass mode of operation is about four to five orders of magnitude faster than said beam scan speed on said object of said image record projecting.

14. The process of claim 1 wherein said projecting emanates from a projector spaced from said object, said object is at a variable distance from said projector, and further comprising providing optical feedback to said projector that determines said variable distance.

15. The process of claim 14 wherein said projecting varies said image record scan speed in response to said distance to control said photosensitive layer reacting.

16. The process of claim 14 wherein said projecting varies said image record scan speed in response to the angle of incidence of said projected light beam on the 3D object and a normal to the surface of the 3D object at the point of incidence of said light beam on the object.

17. A process for recording an image on a 3D surface of an object comprising:

applying on the object a layer of photosensitive material, and guiding said applying by projecting a visible, vector-scan laser light image on the object at a template imaging scan speed.

18. The process of claim 17 wherein said projecting also selectively occurs at an image recording scan speed and said guiding directs a fixing of said recorded image.

19. Apparatus for recording an image on a 3D surface of an object in conjunction with processing of the object comprising:

a laser light projector that steers a output laser light beam to scan a pattern on the object; and a layer of photosensitive material on the surface of the object positioned to receive on at least part of said layer said projected laser light beam, said photosensitive material being substantially insensitive to ambient light for a time sufficient to accomplish the processing, said projector operating in an image recording mode that reacts said layer to thereby record the image.

20. The image recording apparatus of claim 19 wherein said laser light projection also selectively operates in a template imaging mode that provides a stable light image of said image during operation in this mode, but does not develop said layer.

21. The image recording apparatus of claim 20 wherein the speed of said pattern scan in said image record mode when operated in a single pass mode is about four to five orders of magnitude smaller than the speed of said pattern scan in said template imaging mode.

22. Apparatus for recording an image on a 3D surface of an object in conjunction with a processing of the object, comprising:

a vector-scan laser light beam projector that operates in dual pattern scan modes, a first mode adapted to project a glowing template of the image on the object and a second mode adapted to record the image for a period of time sufficient for the processing.

23. The apparatus of claim 22 wherein the speed of said pattern scan in said second mode is about four to five orders of magnitude smaller than the speed of said pattern scan in said first mode.

24. The apparatus of claim 22 or 23 wherein said laser light projector produces a light beam with a wavelength in the visible spectrum for operation in at least first mode.

25. The apparatus of claim 22 or 23 wherein said laser light projector has plural laser light sources, one that operates in said first mode and the other that operates in said second mode.

26. The apparatus of claim 22 or 23 wherein said projector has an optical feedback from the 3D object to determine a variable distance from said projector to the 3D object and a unit that controls said beam scan, said distance being an input to said control unit to vary said scan speed in response to said distance to provide a generally uniform incident light energy density per unit surface area of the 3D object during said projector operation in said second mode.

27. The apparatus of claim 22 or 23 when said projector has a unit that controls said vector scan beam projection in said second mode of operation, in part, as a function of the angle of incidence of said projected light beam with respect to a normal to the surface of said 3D object at the point of incidence of said projected light beam on said surface in order to produce a generally uniform incident light energy per unit surface area of the 3D object during said second mode operation.

* * * * *